(12) United States Patent
Rosser et al.

(10) Patent No.: US 12,516,969 B2
(45) Date of Patent: Jan. 6, 2026

(54) METHOD AND CONTROLLER FOR CONTROLLING A FLUID-FLOW SENSOR

(71) Applicant: Flusso Limited, Cambridgeshire (GB)

(72) Inventors: Chris Rosser, Cambridgeshire (GB); Jon Callan, Cambridgeshire (GB)

(73) Assignee: Flusso Limited, Cambridge (GB)

( * ) Notice: Subject to any disclaimer, the term of this patent is extended or adjusted under 35 U.S.C. 154(b) by 457 days.

(21) Appl. No.: 18/167,334

(22) Filed: Feb. 10, 2023

(65) Prior Publication Data
US 2024/0271976 A1 Aug. 15, 2024

(30) Foreign Application Priority Data
Nov. 15, 2022 (GB) ...................................... 2217059

(51) Int. Cl.
*G01F 1/696* (2006.01)
*G01F 1/7084* (2022.01)

(52) U.S. Cl.
CPC .................................. *G01F 1/696* (2013.01)

(58) Field of Classification Search
CPC ........... G01F 1/696; G01F 1/7084; G01F 1/68
See application file for complete search history.

(56) References Cited

U.S. PATENT DOCUMENTS

| | | | |
|---|---|---|---|
| 4,548,078 A | 10/1985 | Bohrer et al. | |
| 4,733,559 A | 3/1988 | Aine et al. | |
| 6,460,411 B1 | 10/2002 | Kersjes et al. | |
| 6,763,710 B2 | 7/2004 | Mayer et al. | |
| 7,536,908 B2 | 5/2009 | Wang et al. | |
| 7,905,140 B2 | 3/2011 | Kanne | |
| 8,418,549 B2 | 4/2013 | Speldrich et al. | |
| 10,139,256 B2 | 11/2018 | Zhao et al. | |
| 2004/0118218 A1 | 6/2004 | Mayer et al. | |
| 2014/0311912 A1 | 10/2014 | Shih et al. | |
| 2017/0276527 A1 | 9/2017 | Chen et al. | |
| 2018/0172493 A1 | 6/2018 | Speldrich et al. | |
| 2019/0041248 A1* | 2/2019 | Yamazaki | G01F 1/6888 |
| 2021/0116281 A1 | 4/2021 | Udrea et al. | |

OTHER PUBLICATIONS

B. Van Oudheusden, "Control Theory and Applications", IEE Proceedings D, 1988, 1988, pp. 373-380.
B. Van Oudheusden, "Sensors and Actuators A: Physical", 1992, vol. 30, pp. 5-26.
J. T. Kuo, et al., "Micromachines", 2012, vol. 3, pp. 550-573.

(Continued)

*Primary Examiner* — Laura Martin
*Assistant Examiner* — Anthony W Megna Fuentes
(74) *Attorney, Agent, or Firm* — FisherBroyles, LLP

(57) ABSTRACT

A method for controlling a fluid-flow sensor in the presence of a flowing fluid, the method comprising: determining an initial estimate of a parameter corresponding to a flow rate of the flowing fluid, comparing the initial estimate to a threshold parameter, and based on the comparison, determining the parameter corresponding to the flow rate of the flowing fluid based on: a signal from a temperature sensor of the fluid-flow sensor; a signal from a heater of the fluid-flow sensor; or a combination of the signal from the temperature sensor and the heater of the fluid-flow sensor. A controller for a fluid-flow sensor is also described.

14 Claims, 3 Drawing Sheets

(56) References Cited

OTHER PUBLICATIONS

N. Nguyen, "Flow measurement and Instrumentation", 1997, vol. 8, pp. 7-16.
Y.-H. Wang, et al., "Microfluidics and nanofluidics", 2009, vol. 6, pp. 333-346.
Search Report and Written Opinion issued in the related application, LU503465, mailing date Jul. 19, 2023, 8 pages.

* cited by examiner

METHOD AND CONTROLLER FOR CONTROLLING A FLUID-FLOW SENSOR

CROSS-REFERENCES TO OTHER APPLICATIONS

This application claims priority to U.K. patent application No. 2217059.1, for "METHOD AND CONTROLLER FOR CONTROLLING A FLUID-FLOW SENSOR" filed on Nov. 15, 2022, which is hereby incorporated by reference in its entirety for all purposes.

FIELD OF THE DISCLOSURE

The present disclosure relates to a method and a controller for controlling a fluid-flow sensor. The present disclosure particularly relates to a sensor (e.g. a micro-machined sensor) capable of measuring flow of liquids and gases. Particularly but not exclusively, the disclosure relates to a fluid flow sensor having a heater formed within a discontinuous dielectric membrane for sensing properties of a fluid flow or components of a fluid based on thermal conductivity properties.

BACKGROUND

Thermal fluid flow sensors utilise the thermal interaction between the sensor itself and the fluid. Depending upon the physical phenomena governing the interaction, flow sensors can be classified into the following three categories:
(i) anemometric sensors that measure the convective heat transfer induced by fluid flow passing over a heated element;
(ii) calorimetric sensors that detect the asymmetry of the temperature profile generated by a heated element and caused by the forced convection of the fluid flow; and
(iii) time of flight (ToF) sensors that measure the time elapsed between the application and the sensing of a heat pulse.

Reviews of thermal fluid flow sensor have been published in (B. Van Oudheusden, "Silicon flow sensors," in Control Theory and Applications, IEE Proceedings D, 1988, pp. 373-380; B. Van Oudheusden, "Silicon thermal flow sensors," Sensors and Actuators A: Physical, vol. 30, pp. 5-26, 1992; N. Nguyen, "Micromachined flow sensors-A review," Flow measurement and Instrumentation, vol. 8, pp. 7-16, 1997; Y.-H. Wang et al., "MEMS-based gas flow sensors," Microfluidics and nanofluidics, vol. 6, pp. 333-346, 2009; J. T. Kuo et al., "Micromachined Thermal Flow Sensors-A Review," Micromachines, vol. 3, pp. 550-573, 2012). Further background can also be found in U.S. Pat. No. 6,460,411 by Kersjes et al.

Generally, a thermal flow sensor comprises a heating element and a temperature sensing element thermally isolated from a substrate (e.g. embedded within a membrane, a bridge, a cantilever, etc.). Both heating and temperature sensing elements are typically positioned in the most thermally isolated area (e.g. in the centre of a membrane, in the centre of a bridge, and the end of a cantilever, etc.). Flow sensors based on other principles such as ultrasonic or pressure based are also possible.

Generally, sensor chips are packaged on a substrate, and covered with a lid having inlets & outlets for fluid flow. Examples are given in U.S. Pat. No. 8,418,549B2, US20180172493. However, such packages tend to be bulky, making them unsuitable for space constrained applications, such as handheld devices.

US2014/0311912 reports a device where the sensor chip/substrate is covered with a lid that makes up the channel. The bond pads are not covered by the lid and are used to provide electrical connection. U.S. Pat. No. 7,905,140B2 presents a device where a substrate with the flow channel is attached on top of a flow sensor chip, with electrical connections made by either wire bonding or through holes. US2004/0118218 also shows a similar device, with the flow channel substrate attached to the chip and lead throughs to form the electrical connection. U.S. Pat. No. 10,139,256 describes a device made from two semiconductor substrates bonded together, with one having the inlet to the flow channel, and one an outlet. One of the substrates has the flow sensor. Electrical connection is made by conducting vias and conductive flow paths on the surface of the substrates. U.S. Pat. No. 4,548,078A describes a flow channel through the back of a flow sensor chip. U.S. Pat. No. 6,763,710B2 talks about a sensor with two sensing modes.

SUMMARY

According to the present invention, there is a flow sensor comprising a heater, a first temperature sensor, and a controller that has three different measurement modes in three different measurement regions: (1) At low flows using the signal from the first temperature sensor to report the flow rate (using a calorimetric method), (2) At high flows using the signal from the heater to report the flow rate (using an anemometric method), (3) At medium flows using the signals from the heater as well as the temperature sensor in a weighted average (of the anemometric and calorimetric method) to report the flow rate.

There could also be a second temperature sensor. The first and second temperature sensors can be on opposite sides of the heater. The signal from the two temperature sensors can be the difference of a temperature, voltage, current or power between the two temperature sensors.

The present disclosure relates to a flow sensor and connected controller. The controller may be integrated with the sensor on the same substrate. Alternatively, the controller may be integrated with the sensor within the same component package. Alternatively, the controller may be separate from the sensor component but connected to it by wires, traces, or other electrical connections.

Described herein is a method for controlling a fluid-flow sensor in the presence of a flowing fluid. The method may comprise: determining an initial estimate of a parameter corresponding to a flow rate of the flowing fluid, and comparing the initial estimate to a threshold parameter.

The method may further comprise, based on the comparison, determining the parameter corresponding to the flow rate of the flowing fluid based on:
a signal from a temperature sensor of the fluid-flow sensor;
a signal from a heater of the fluid-flow sensor; or
a combination of the signal from the temperature sensor and the heater of the fluid-flow sensor.

The parameter corresponding to the flow rate of the flowing fluid may correspond to a value, determined from a measurement and/or a signal, which is analogous to the flow rate.

The initial estimate of the parameter may be determined directly, or may be determined based on a value (e.g. determined from a measurement and/or a signal) that is analogous or corresponding to the flow rate.

The initial estimate may be determined based on a signal from a temperature sensor of the fluid-flow sensor, a heater of the fluid-flow sensor, or a combination of the two.

The threshold parameter may be a first (e.g. lower) threshold parameter. The threshold parameter may be a second (e.g. upper) threshold parameter.

The method may comprise comparing the initial estimate to a first threshold parameter, and when the initial estimate is below the first threshold parameter: determining the parameter corresponding to the flow rate based on the signal from the temperature sensor of the fluid-flow sensor.

When the initial estimate is below the first threshold parameter, the method may comprise determining the parameter corresponding to the flow rate based on the signal from the temperature sensor of the fluid-flow sensor normalised by (e.g. divided by) the signal from the heater.

The method may comprise comparing the initial estimate to a second threshold parameter, and when the initial estimate is above the second threshold parameter: determining the parameter corresponding to the flow rate based on the signal from the heater of the fluid-flow sensor.

The method may comprise, when the initial estimate is between the first threshold parameter and the second threshold parameter: determining the parameter corresponding to the flow rate based on a combination of the signal from the temperature sensor and the heater of the fluid-flow sensor.

The combination of the signals from the temperature sensor and the heater of the fluid-flow sensor may comprise a weighted average of said signals.

The ratio of contribution by the signals from the temperature sensor and the heater of the fluid flow sensor may depend on the difference of the initial estimate to the first threshold parameter and the difference to the second threshold parameter.

The signal from the temperature sensor may comprise signals from two temperature sensors, and/or may comprise a difference between the signals from two temperature sensors.

It should be noted that it is not necessary to use the actual flow value for the initial estimate.

Instead another value or parameter corresponding to the flow rate can be used instead. This could be a heat transfer coefficient, a voltage, current, or power, or any other value that can be derived from the signal received from the heater and/or temperature sensor. Similarly the values for the first and second threshold parameters can be a value corresponding to a flow rate. The method may also determine as an output a value or parameter corresponding to the flow rate rather than a flow rate itself.

The flow rate can be in the form of a mass flow, volume flow, differential pressure or speed.

Each of the signals may comprise, for example, a voltage, a current, a power, and/or a temperature.

This method is advantageous as it takes advantage of the optimum sensitivities of both the anemometric and calorimetric modes. The anemometric mode is more sensitive at higher flow rates, while the calorimetric method is more sensitivity at lower flow rates. The third mode for medium flows (e.g. between the first and second thresholds) allows a smooth transition between the two modes, which otherwise may not be possible.

Also described herein is a controller for controlling a fluid-flow sensor in the presence of a flowing fluid. The controller may be configured, when the fluid-flow sensor is in the presence of a flowing fluid, to: determine an initial estimate of a parameter corresponding to a flow rate of the flowing fluid, and compare the initial estimate to a threshold parameter. The controller may be further configured, based on the comparison, to determine the parameter corresponding to the flow rate of the flowing fluid based on:
 a signal from a temperature sensor of the fluid-flow sensor;
 a signal from a heater of the fluid-flow sensor; or
 a combination of the signal from the temperature sensor and the heater of the fluid-flow sensor.

The parameter corresponding to the flow rate of the flowing fluid may correspond to a value, determined from a measurement and/or a signal, which is analogous to the flow rate.

The controller may be configured to determine the initial estimate of the parameter corresponding to the flow rate directly, or based on a value (e.g. determined from a measurement and/or a signal) that is analogous to the flow rate.

The initial estimate may be determined based on a signal from a temperature sensor of the fluid-flow sensor, a heater of the fluid-flow sensor, or a combination of the two.

The threshold parameter may be a first (e.g. lower) threshold parameter. The threshold parameter may be a second (e.g. upper) threshold parameter.

The controller may be configured to: compare the initial estimate to a first threshold parameter and, when the initial estimate is below the first threshold parameter: determine the parameter corresponding to the flow rate based on the signal from the temperature sensor of the fluid-flow sensor.

The controller may be configured to: compare the initial estimate to a first threshold parameter and, when the initial estimate is below the first threshold parameter: determine the parameter corresponding to the flow rate based on the signal from the temperature sensor of the fluid-flow sensor normalised by (e.g. divided by) the signal from the heater.

The controller may be configured to: compare the initial estimate to a second threshold parameter and, when the initial estimate is above the second threshold parameter: determine the parameter based on the signal from the heater of the fluid-flow sensor.

The controller may be configured, when the initial estimate is between the first threshold parameter and the second threshold parameter, to determine the parameter corresponding to the flow rate based on a combination of the signal from the temperature sensor and the heater of the fluid-flow sensor.

The combination of the signals from the temperature sensor and the heater of the fluid-flow sensor comprises a weighted average of said signals.

Each of the signals may comprise, for example, a voltage, a current, a power, and/or a temperature.

Advantageously, a fluid-flow sensor controlled by a controller according to the present disclosure is advantageous as it takes advantage of the optimum sensitivities of both the anemometric and calorimetric modes. The anemometric mode is more sensitive at higher flow rates, while the calorimetric method is more sensitivity at lower flow rates. The third mode for medium flows (e.g. between the first and second thresholds) allows a smooth transition between the two modes, which otherwise may not be possible.

The controller determines the flow rate (or a value or parameter corresponding to the flow rate) through the anemometric method (using the heater signal only) and/or the calorimetric method (using the signal(s) from the temperature sensor(s)). The signals from one or both methods may be used to make an initial determination of the flow rate (or a value or parameter corresponding to the flow rate) to determine if the flow (or a corresponding value or parameter) is in the low, medium or high flow range. Based on this, the controller decides if the flow is in the low, medium or high flow rate, and uses the appropriate method to report a more accurate value of the flow rate, and/or parameter corresponding to the flow rate.

The value or flow rate used to determine if the flow is in low, medium or high flow range may or may not be compensated for temperature or pressure.

The initial estimate of the parameter or flow rate may be provided by a source external to the sensor.

The heater may be operated in a constant current, constant power, constant voltage or constant temperature mode. The heater may be operated in a constant bias, a pulsed bias, or a pulse width modulation (PWM) bias. The signal from the heater may be a voltage, current, power, temperature or even the PWM duty cycle. The signal from the temperature sensors could be a voltage, current, power or temperature.

Preferably there are two temperature sensors, one of the temperature sensors would be located upstream from the heater, and the other downstream. The temperature sensors may be the same distance from the heater, but can also be at different distances. The temperature sensors can also be on the same side of the heater but at different distances.

At low flows the flow rate is determined and reported using a calorimetric method. In this the signal from the temperature sensor is used. This may be the signal from one temperature sensor, or from two temperature sensors.

At high flows the flow rate is determined and reported using an anemometric method. In this the signal from the heater is used.

At medium flows, the flow rate (or a value or parameter corresponding to the flow rate) is independently determined by both the anemometric method (signal from the heater), and the calorimetric method (signal from the temperature sensor), and depending on the initial estimated flow rate or corresponding parameter, a weighted average of both methods is used to determine and report the flow rate.

For example, the controller may be designed to consider a flow rate below "X" to be a low flow, and a flow rate below "Y" to be a high flow. If the initial determined flow rate is found to be exactly between "X" and "Y", then the reported flow rate will be the average of the flow rate determined by anemometric and calorimetric methods.

However, if the initially estimated flow rate is closer to "Y", then a larger proportion of the anemometric value will be used to determine and report the final flow value.

As an equation this can be written as:

$$FF = \frac{(IF - X)}{(Y - X)}FA + \frac{(Y - IF)}{(Y - X)}FC$$

Where:
FF is the final determined flow rate
IF is the initial flow estimate
FA is the flow rate determined by the anemometric method.
FC is the flow rate determined by the calorimetric method.

Alternatively, instead of the actual flow rate, another value corresponding to the flow rate may be used instead, which is then converted to an actual flow rate. Compensation (e.g. for temperature or pressure) may be applied to this value at any stage of the calculation. Compensation may also be applied to the final flow value just before reporting. Averaging or other signal processing techniques may also be applied at any stage.

This examples uses a linear weighted average. However, other calculations may be used, based on other function types, such as quadratic or exponential.

The flow sensor may comprise a semiconductor substrate comprising an etched portion; a dielectric region located on the substrate, wherein the dielectric region comprises at least one dielectric membrane located over the etched portion of the semiconductor substrate; a heating element located within the dielectric membrane; a first temperature sensing element and a second temperature sensing element located within the dielectric membrane; and a controller.

Also described herein is a device comprising a fluid-flow sensor and a controller as described herein.

Additionally described herein is a controller for controlling a fluid-flow sensor in the presence of a flowing fluid, the fluid-flow sensor comprising a heater and one or more temperature sensors.

The controller may be configured, in a first mode, to determine a parameter corresponding to a flow rate of the flowing fluid based on signals from the one or more temperature sensors and from the heater.

The controller may be configured, in a second mode, to determine the parameter based on a signal from the heater only.

The controller may be further configured to: determine an initial estimate of the parameter.

When the initial estimate is below a first threshold parameter, the controller may be configured to operate in the first mode.

When the initial estimate is above a second threshold parameter, the controller may be configured to operate in the second mode.

When the initial estimate is between the first and second threshold parameters, the controller may be configured to operate in a combination of the first and second modes.

Operating in a combination of the first and second modes may comprise determining a weighted average of the parameter determined according to the first mode and the parameter determined according to the second mode.

The fluid-flow sensor may comprise two temperature sensors. The controller may be configured, in the first mode, to determine the parameter based on signals from the two temperature sensors and from the heater.

The controller may be configured, in the first mode, to determine the parameter based on the difference in signals between the two temperature sensors, and further normalized by a signal from the heater.

In some non-limiting examples, a method and/or a controller according to the present disclosure may be suitable for use with a fluid-flow sensor according to one or more of the following examples:

A flow and thermal conductivity sensor may comprise: a semiconductor substrate comprising an etched portion; a dielectric region located on the substrate, wherein the dielectric region comprises at least one dielectric membrane located over the etched portion of the semiconductor substrate; a heating element located on or within the dielectric membrane; and a first temperature sensor located on or within the dielectric membrane.

There may be a second temperature sensor located on or within the dielectric membrane. The first and second temperature sensors may be on opposite sides of the heater at the same distance of the heater. They can also be at different distances from the heater.

The first and second temperature sensors may be located on the same side of the heater but at different distances.

The dielectric membrane may comprise one or more recessed regions. These help to reduce the device power consumption, and also with equalizing pressure on both sides of the dielectric membrane.

The dielectric region may comprises a dielectric layer or a plurality of layers including at least one dielectric layer. The heating element may be fully embedded or partially embedded within the dielectric membrane.

Generally speaking, a dielectric membrane region may be located immediately adjacent to the etched portion of the substrate. The dielectric membrane region corresponds to the area of the dielectric region above the etched cavity portion of the substrate. Each dielectric membrane region may be over a single etched portion of the semiconductor substrate.

The sensor may be designed to be used as both a flow and thermal conductivity sensor.

The heater temperature may be modulated by applying different power levels to increase sensitivity and selectivity to different flow rates and fluid types.

The heater may be operated in a pulse mode (e.g. driven with a square wave, sinusoidal wave, Pulse Width Modulated wave, Pulse Density Modulation, etc.) or continuous mode. The pulse mode has, among others, the advantage of reduced power consumption, reduced electromigration for enhanced device reliability/lifetime and improved fluid properties sensing capabilities.

In the Anemometric method, the heating element may be configured to operate as a sensing element, by for example sensing the change in the resistance due to the change in temperature. The heating element may operate simultaneously as both a heating element and a sensing element. The heating element is electrically equivalent to a resistor. The thermal conductivity of most heaters materials (Tungsten, Titanium, Platinum, Aluminium, polysilicon, monocrystalline silicon) varies with temperature. This variation is mostly linear and is characterised by the TCR (Temperature coefficient of resistance). The TCR can be positive or negative, but most metals have a positive and stable TCR, meaning that their resistance increases when the temperature is increased. When current flows through the heating element, the heating element becomes hot, heating the membrane around it. If the heater is operating at the same power, as the fluid flows above the heater, it cools down the heater, due to convection, modifying its resistance (lower resistance for a positive TCR). The heater could also be driven in constant resistance or constant temperature modes and one can associate the change in the power needed to maintain the heater resistance or temperature of the heater with the change in flow. The sensor may be able to measure the properties of a flow such as flow rate, velocity, mass or volume flow rates as well as the composition of the fluid. The device may be configured to measure flow properties such as flow rate, velocity, mass or volume flow rates by means of sensing the change in the temperature, voltage, current, resistance or power depending on the bias applied to the heater.

Alternatively, the flow could be measured by employing one or more sensing elements. Preferably two temperature sensitive elements are placed on either side of the heater within the same dielectric membrane and optionally used as a differential pair. The differential pair may be formed of one upstream sensing element and one downstream sensing element.

There may be a recessed region located between the heater and the temperature sensor.

The temperature sensing elements may comprise resistive temperature detectors, diodes, or thermopiles. Thermopiles may be used measure a temperature difference between the dielectric membrane and the dielectric region above the substrate, or may be used to measure a temperature difference across the heating element. Compared to the thermopiles, diodes and detectors have reduced thermal losses to the semiconductor substrate as they are located completely on or within the dielectric membrane. One type of sensing element may be used or a combination of different types of sensing elements may be used.

The sensing elements may be temperature sensitive and may be any of resistive temperature detectors, bolometers, diodes, transistors or thermopiles, or an array in series or parallel or a combination of those.

The sensing elements can also be made of thermopiles. A thermopile comprises one or more thermocouples connected in series. Each thermocouple may comprise two dissimilar materials which form a junction at a first region of the membrane, while the other ends of the materials form a junction at a second region of the membrane or in the heat sink region (substrate outside the membrane area), where they are connected electrically to the adjacent thermocouple or to pads for external readout. The thermocouple materials may comprise a metal such as aluminium, tungsten, titanium or combination of those or any other metal available in the process. Alternatively the thermocouple materials may comprise thermocouples based on n-type and p-type silicon or polysilicon or combinations of metals and semiconductors. The position of each junction of a thermocouple and the number and the shape of the thermocouples may be any required to adequately map the temperature profile distribution over the membrane to achieve a specific performance.

The calorimetric measurements can be done by a single temperature sensor, or two temperature sensors. Preferably there are two temperature sensors on either side of the heater. The temperature sensors can be resistors, thermopiles, and/or diodes. Preferably the same bias is applied to both the temperature sensors if resistors or diodes. Thermopiles do not necessarily need a bias. The controller might directly read a signal (voltage, current, resistance, or power) from both of them, and subtract them. The control might also apply a different calculation or function to the signal from the two temperature sensors. Alternatively, there may be a circuit that voltage from both sensors as input to a differential amplifier, and uses the output as the signal from the temperature sensors.

The sensing elements formed within the dielectric membrane, may be configured as a temperature resistor detector (TRD) or a bolometer, a diode, a transistor or an array of transistors or diodes for enhanced sensitivity and selectivity.

In use, the heating element may extend in a direction perpendicular to the direction of flow through the sensor. The heating element may not be at an exact right angle to the direction of flow, and may extend in a diagonal direction or at an acute angle to the direction of flow however one component of the extension of the heating element may be perpendicular to the flow. Optionally, the heating element may be substantially perpendicular or may be arranged at an angle within 10° to the direction perpendicular to the flow through the sensor.

The dielectric membrane may be circular. The heating element and sensing elements may have circular shapes. This improves use of the membrane area and increases thermal performance.

The sensor may further comprise an application specific integrated circuit (ASIC) coupled to the sensor. The ASIC may be located underneath the sensor, for example using a die stack technique. Alternatively, the ASIC may be located elsewhere. The ASIC may be connected to the sensor using wire bonding and pads, or using through-silicon-vias (TSV) extending through the semiconductor substrate. The controller may be within the ASIC.

An ASIC may be provided within the same system or the same package or on-chip to provide electronic circuitry to drive, read-out signals and process signals from the sensor. The ASIC may be placed in a stack die configuration under the sensor and the sensor and ASIC are placed within a manifold.

Analog/digital circuitry may be integrated on-chip. Circuitry may comprise IPTAT, VPTAT, amplifiers, analog to digital converters, memories, RF communication circuits, timing blocks, filters or any other mean to drive the heating element, read out from the temperature sensing elements or electronically manipulate the sensor signals. For example, it is demonstrated that a heating element driven in constant temperature mode results in enhanced performance and having on-chip means to implement this driving method would result in a significant advancement of the state-of-the-art flow sensors. In absence of on-chip circuitry, this disclosure also covers the off-chip implementation of such circuital blocks when applied to a flow sensor having one or more features described in any of the previous embodiments. Such off-chip implementation may be done in an ASIC or by discrete components, or a mix of the two.

The device may be packaged in a metal TO type package, in a ceramic, metal or plastic SMD (surface mount device) package. The device may also be packaged directly on a PCB, or with a flip-chip method. The device may also be embedded in a substrate, such as a customised version of one of the previously mentioned package, a rigid PCB, a semi-rigid PCB, flexible PCB, or any other substrate, in order to have the device surface flush with the substrate surface. The package can also be a chip or wafer level package, formed for example by wafer-bonding.

The device may also be assembled within a manifold which provides an inlet, outlet and a pre-defined channel through which the fluid flow takes place. The manifold provides protection to the device as well as allowing easier and more controllable measurement of the flow or the fluid composition. The ASIC or external read-out circuitry may also be placed in the same manifold in a lateral or die stack configuration.

The flow sensor may have through silicon vias (TSV), to avoid the presence of bond wires in proximity of the sensitive area of the device which might affect the flow sensor readings. Advantageously, a flow sensor with TSV can enable 3D stacking techniques. For instance the flow sensor chip can sit on top of an ASIC, thus reducing the sensor system size.

The semiconductor substrate may be silicon and the dielectric membrane may be formed mainly of oxide and nitride materials and where the heater is made of a metal such as tungsten, titanium, copper, aluminium, gold, platinum or a combination of those or a semiconductor such as highly doped n type or p type silicon or polysilicon and where the heater has a shape of a meander, spiral or a hotwire.

The starting substrate may be any semiconductor such as silicon, silicon on insulator (SOI), Silicon Carbide, Sapphire or Diamond. In particular the use of silicon is advantageous, as it guarantees sensor manufacturability in high volume, low cost and high reproducibility. The use of a silicon substrate could also enable on-chip circuitry for sensor performance enhancement and system integration facilitation. Such on-chip circuitry could be implemented by using analog or digital or mixed-signal blocks placed outside the dielectric membrane.

The dielectric membrane or multiple membranes may be formed by back-etching using Deep Reactive Ion Etching (DRIE) of the substrate, which results in vertical sidewalls and thus enabling a reduction in sensor size and costs. However, the back-etching can also be done by using anisotropic etching such as KOH (Potassium Hydroxide) or TMAH (TetraMethyl Ammonium Hydroxide) which results in slopping sidewalls. The dielectric layers within the membrane which could be formed by oxidation or oxide deposition could be used as an etch stop during the DRIE or wet etching processes. The membrane can also be formed by a front-side etch or a combination of a front-side and back-side etch to result in a suspended membrane structure, supported only by two or more beams. The membrane may be circular, rectangular, or rectangular shaped with rounded corners to reduce the stresses in the corners, but other shapes are possible as well. Additionally holes may be formed within the membrane to reduce the thermal dissipation via the heat conduction through the dielectric membrane and enhance the heat loss via heat convention and conduction in the regions below and above the membrane, and optionally in the path of the fluid (above the membrane). Optionally the holes or discontinuities may be made by front etching after the membrane is formed.

The dielectric membrane may comprise silicon dioxide and/or silicon nitride. The membrane may also comprise one or more layers of spin on glass, and a passivation layer over the one or more dielectric layers. The employment of materials with low thermal conductivity (e.g. dielectrics) enables a significant reduction in power dissipation as well as an increase in the temperature gradients within the membrane with direct benefits in terms of sensor performance (e.g. sensitivity, frequency response, range, etc.). Temperature sensing elements or heaters made of materials such as monocrystalline or polycrystalline semiconductors or metals could be suspended or embedded in the dielectric membrane.

The membrane may also have other structures made of metal or other conductive or other materials with higher mechanical strength. These structures can be embedded within the membrane, or may be above or below the membrane, to engineer the thermo-mechanical properties (e.g. stiffness, temperature profile distribution, etc.) of the membrane and/or the fluid dynamic interaction between the fluid and the membrane. More generally these structures can be also outside the membrane and/or bridging between inside and outside the membrane.

The fluid sensed may be a gas, and the gas may be made of air and/or other components such as $CO_2$, methane or hydrogen or other gases that have different thermal conductivity than that of air. The fluid sensed could also be a liquid.

The substrate may comprise: more than one etched portion; a dielectric region located on the substrate, wherein the dielectric region comprises a dielectric membrane over each area of the etched portion of the substrate. At least one membrane may contain any combination of the features described above.

In some examples, the method and/or the controller of the present disclosure may be suitable for use with a sensor of the kind described in US 2021/0116281, the contents of which are hereby incorporated by reference in their entirety.

BRIEF DESCRIPTION OF THE DRAWINGS

Some embodiments of the disclosure will now be described by way of example only and with reference to the accompanying drawings, in which.

DETAILED DESCRIPTION

Figure 1:
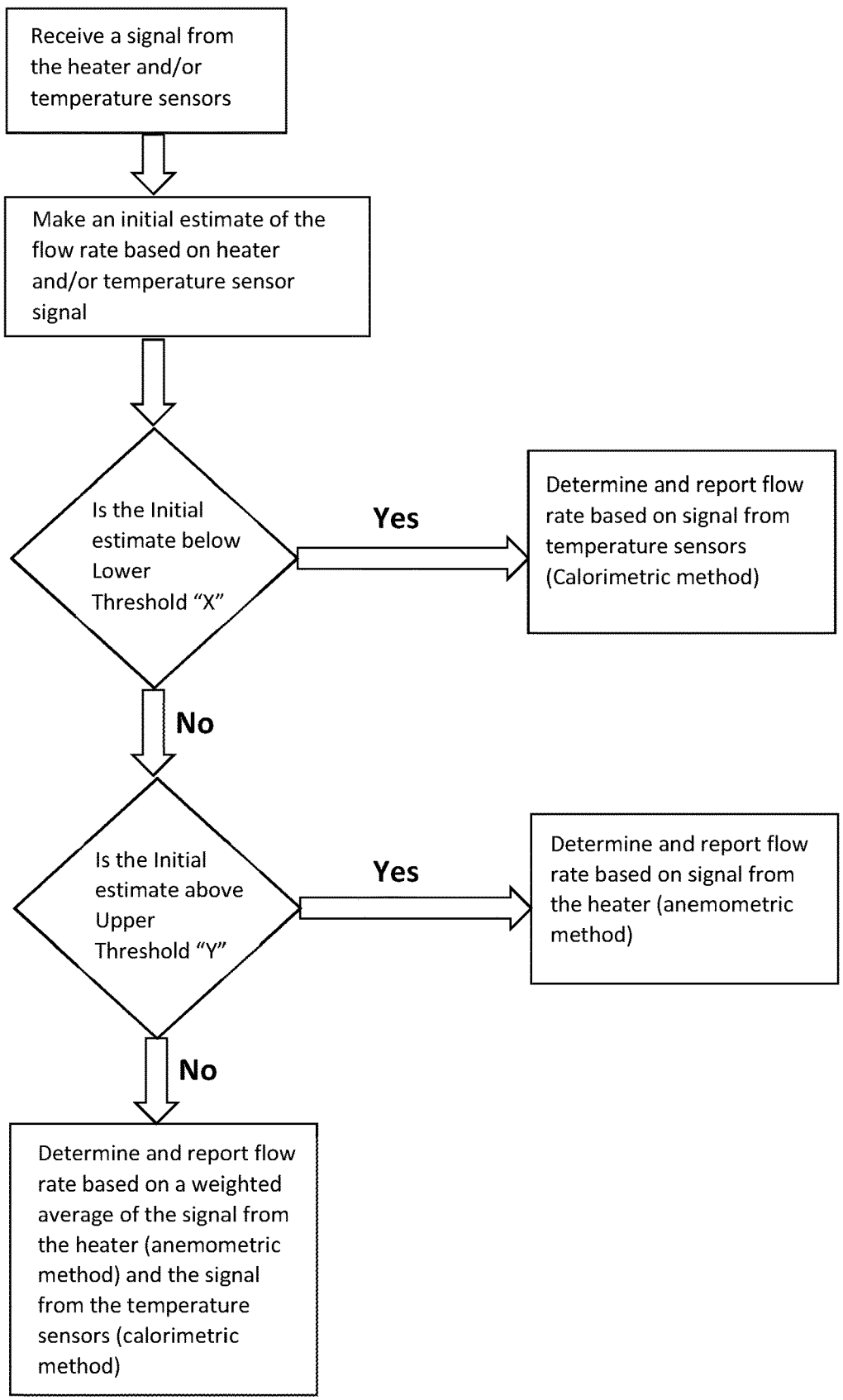
FIG. 1 shows a flow diagram of an example algorithm used by the controller of the flow sensor.

FIG. 1 shows a flow diagram (e.g. of an algorithm) of the flow sensor used to determine the actual flow rate.

The controller initially receives a signal from a heater and/or temperature sensor.

It then uses these signal(s) to make an initial estimate of the flow rate

If the flow rate is below a lower threshold, it determines the flow rate based on the signals from the temperature sensors (calorimetric method), otherwise it goes to the next step.

If the flow rate is above an upper threshold, it determines the flow rate based on the signal from the heater (anemometric method), otherwise it goes to the next step.

If none of the above conditions are satisfied, then it determines the flow based on a weighted average of the heater signal (anemometric method) and the temperature sensor signals (calorimetric method) based on the initial estimated flow rate, and the difference of the estimated flow rate to the upper and lower thresholds.

In the last case, if the estimated flow rate is closer to the upper threshold, then the final flow value is determined using a higher proportion of the anemometric method. If the estimated flow rate is closer to the lower threshold, then the final flow value is determined using a lower proportion of the calorimetric method.

It should be understood that the figure gives one possible sequence of events. It is also possible that the controller first checks against the upper threshold, before checking against the lower threshold. Or it might first check if the estimated flow is between the upper and lower thresholds.

Also while FIG. 1 shows actual flow values being used, it is also possible to use signals or values that are not an actual flow value, but values that correspond to the flow. These signals or values may already be compensated for environmental factors such as temperature or pressure, or they may need compensating for environmental factors.

Such values or signals could be a heat loss factors from the heater, a temperature difference between the two temperature sensors, a temperature value, voltage, current or power from the heater and/or temperature sensors. It could also be a value derived from any of these values.

Depending on the controller implementation, the upper and lower threshold values may be fixed. They may also change depending on calibration and/or environmental changes, such as changes in temperature or pressure.

The signals from the temperature sensor can either be two separate signals, or may be just one signal—for example the difference between signals from the two temperature sensors.

Figure 2:
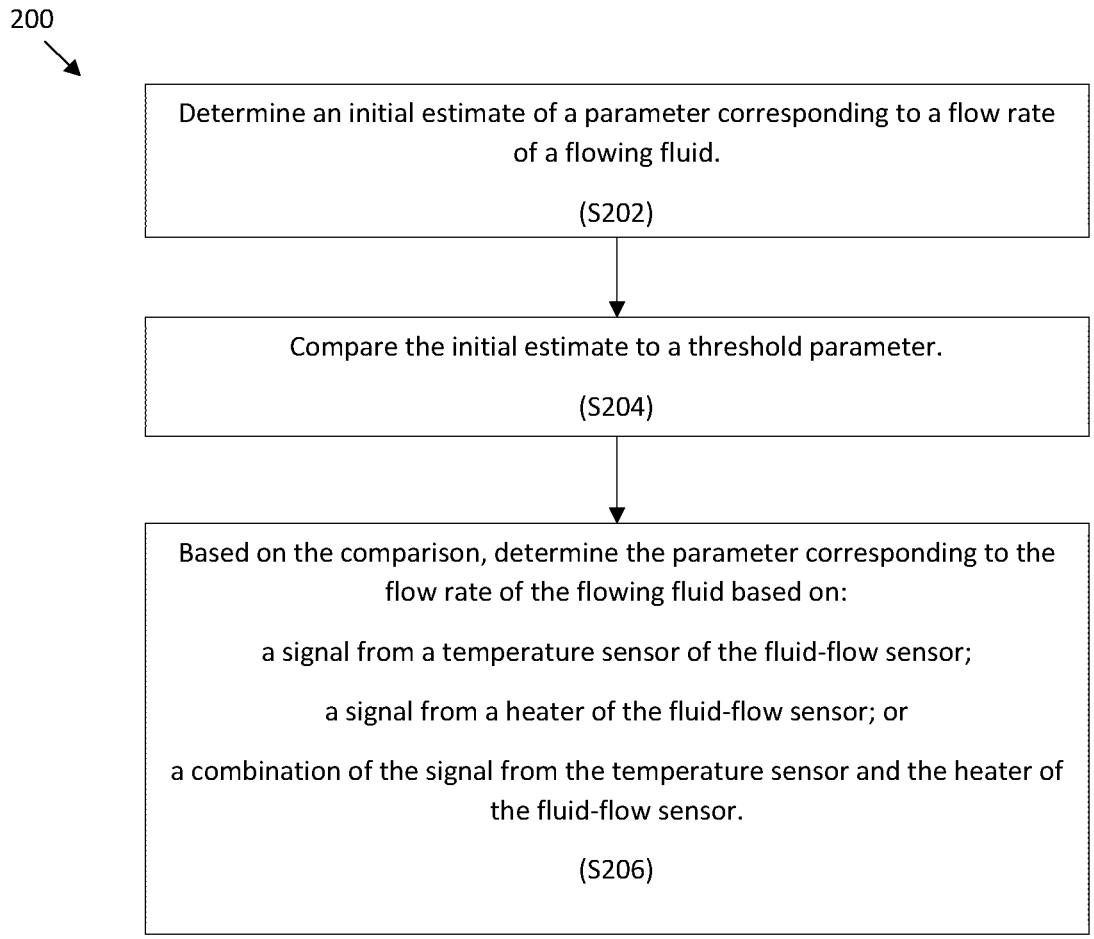
FIG. 2 illustrates an example method according to the present disclosure.

FIG. 2 illustrates an example of a method 200 according to the present disclosure. The method 200 may be carried out by a controller according to the present disclosure. For example, one or more steps of the method 200 may be provided as instructions to the controller, for example in the form of computer code. In some examples, the method 200 of the disclosure may be carried out by executing computer code stored on, or accessible to, the controller.

In a step S202 of the method 200, an initial estimate of a parameter corresponding to a flow rate of a flowing fluid is determined.

In a step S204 of the method 200, the initial estimate is compared to a threshold parameter.

In a step S206 of the method 200, based on the comparison, the parameter corresponding to the flow rate of the flowing fluid is determined based on: a signal from a temperature sensor of the fluid-flow sensor;
a signal from a heater of the fluid-flow sensor; or
a combination of the signal from the temperature sensor and the heater of the fluid-flow sensor.

Figure 3:
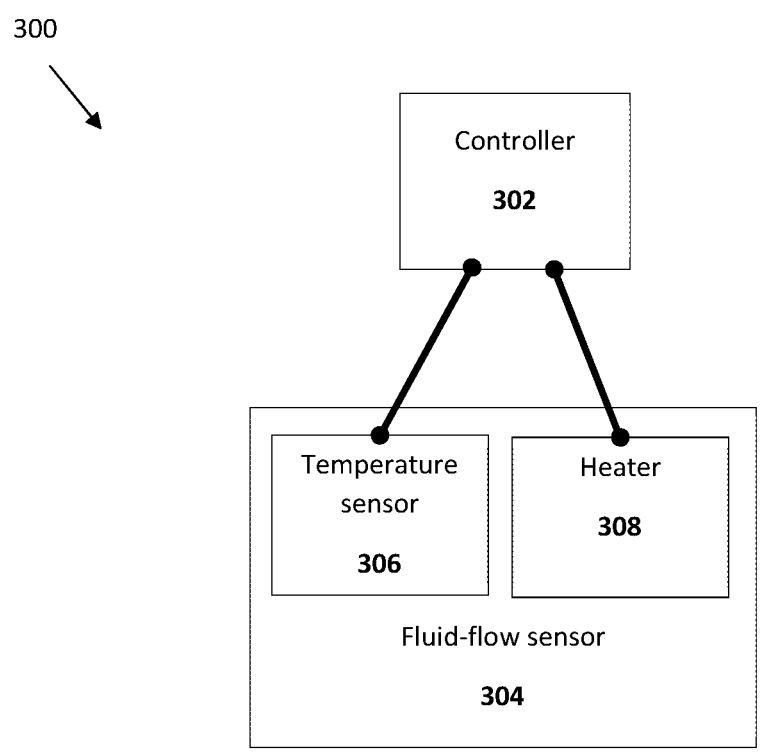
FIG. 3 illustrates schematically a system comprising a fluid-flow sensor and a controller.

FIG. 3 illustrates a device 300, the device 300 comprising a controller 302 according to the present disclosure, the device 300 further comprising a fluid-flow sensor 304.

The fluid-flow sensor 304 comprises a temperature sensor 306 and a heater 308. The controller 302 is connected to (i.e. in communication with) the temperature sensor 306 and the heater 308 of the fluid-flow sensor 304. That is, the controller 302 is able to receive signals from the temperature sensor 306 and the heater 308. The controller 302 is preferably also able to send signals to the temperature sensor and/or the heater 308.

The controller 302 is configured, when the fluid-flow sensor 304 is in the presence of a flowing fluid, to determine an initial estimate of a parameter corresponding to a flow rate of the flowing fluid. For example, the initial estimate may be determined based on a signal from the temperature sensor 304 and/or the heater 306. For example, the controller 302 may be configured to determine the initial estimate based on an anemometric method and/or a calorimetric method.

The controller 302 is further configured to compare the initial estimate to a threshold parameter. The threshold parameter may be stored in a memory, or otherwise may be provided to the controller 302.

The controller 302 is further configured to determine, based on the comparison, the parameter corresponding to the flow rate of the flowing fluid. The parameter corresponding to the flow rate may be determined from, e.g., a signal (e.g. a voltage) received by the controller 302 from the temperature sensor 306 and/or from the heater 308.

It may be the case that a calorimetric method of measuring flow rate provides a stronger signal than an anemometric method at lower flow rates (low air velocities), and that an anemometric method provides a stronger signal than a calorimetric method at higher flow rates (high air velocities). It may therefore be advantageous to use a calorimetric measurement at low flow rates and an anemometric measurement at high flow rates.

The fluid-flow sensor 304 may further comprise a second temperature sensor (not shown), for example a first temperature sensor may be located upstream from the heater 308 (according to the path of the flowing fluid) and a second temperature sensor may be located downstream from the heater 308. The controller 302 may be configured to receive (and send) signals from (and to) the first and second temperature sensors. The first and second temperature sensors may be employed in a calorimetric method of measuring flow rate.

The methods and the controller 302 according to the present disclosure advantageously enable "cross fading", or transitioning, between the two measurement methods according to the flow rate to benefit from the best possible signal to noise ratio for a given measurement.

There may therefore be defined two modes of operation for the controller 302: a first mode in which the flow rate (the parameter corresponding to the flow rate) is determined using signals from the heater and the temperature sensor(s) (i.e. a calorimetric method); and a second mode in which the flow rate (the parameter corresponding to the flow rate) is determined using a signal from the heater only (i.e. an anemometric method).

The controller 302 may be configured to operate the fluid-flow sensor 302 according to the first mode when the initial estimate of the flow rate (the parameter corresponding to the flow rate) is below a first threshold (threshold parameter), and according to the second mode when the initial estimate is above a second threshold (threshold parameter).

A transition region may exist in which the initial estimate is between the first and second thresholds (threshold parameters). In the transition region, both measurement methods (calorimetric and anemometric) may provide a relatively similar strength signal (i.e. a similar signal to noise ratio).

In the transition region, the controller 302 may be configured to operate according to a combination of the first and second modes according to the initial estimate. For example, the controller 302 may be configured to determine a weighted average of the flow rates (parameters corresponding to the flow rates) determined according to the first and second modes.

In an example, the bottom of the transition region is defined as (t_min) and the top of the transition region is defined as (t_max). Then a first polynomial mapping f is determined that maps h_c onto h_a from 0 flow to the top of the transition region (t_max). This ensures that a second polynomial mapping g from h_a to flow/velocity/DP etc. can be used across the whole flow range.

From 0 to the bottom of the transition region (t_min) h_c is mapped onto h_a using the first polynomial mapping f. f(h_c) is then mapped onto flow using the second polynomial mapping g.

$$\text{Therefore: Flow} = g(f(\text{h\_c})) \text{ for h\_a} < \text{t\_min}$$

Within the transition region a weighted average between f(h_c) and h_a is used to determine the heat transfer coefficient that is converted to flow/DP/velocity using the second polynomial mapping. The weighting linearly varies from 100% f(h_c) at t_min to 100% h_a at t_max. Therefore: Flow=g[h_a*(h_a−t_min)/(t_max−t_min)+f(h_c)*(t_max−h_a)/(t_max−t_min)] for t_min<h_a<t_max Above the transition region h_a is converted to flow using the second polynomial mapping.

$$\text{Therefore: Flow} = g(\text{h\_a}) \text{ for h\_a} > \text{t\_max}$$

The above example calculations may be carried out by the controller 302.

As described herein, the controller 302 may be configured to carry out the methods (e.g. the method 200 illustrated in FIG. 2) described herein. For example, the controller 300 may be configured to execute instructions (e.g. in the form of computer program code) as described herein. The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

The present disclosure may be further defined according to one or more of the following non-limiting clauses:

1. A fluid flow sensor comprising a heater, a first temperature sensor, a controller, where the controller is configured to:
   Make an initial estimate of the flow rate, or a value corresponding to the flow rate;
   If the initial estimate of the flow rate or value corresponding to the flow rate is below a lower threshold then uses the signals from the temperature sensors to determine the final flow rate, or a value corresponding to the flow rate;
   If the initial estimate of the flow rate or value corresponding to the flow rate is above an upper threshold then uses the signal from the heater to determine the final flow rate, or a value corresponding to the flow rate;
   If the initial estimate of the flow rate or value corresponding to the flow rate is between an upper and lower threshold then uses the signal from the heater and the signals from the temperature sensor to determine the final flow rate, or a value corresponding to the flow rate.
2. A fluid flow sensor according to clause 1 where there is a second temperature sensor.
3. A fluid flow sensor according to clause 2 where the first and second temperature sensors are on opposite sides of the heater.
4. A fluid flow sensor according to clause 1 where the upper and lower threshold values are always fixed
5. A fluid flow sensor according to clause 1 where the upper and lower threshold values may change based on a calibration or environmental changes.
6. A fluid flow sensor according to clause 1 where the initial estimate of the flow rate is based on the signal from the heater.
7. A fluid flow sensor according to clause 1 where the initial estimate of the flow rate is based on the signals from the temperature sensors.
8. A fluid flow sensor according to clause 1 where the initial estimate is based on signal from the heater and signals from the temperature sensors.
9. A fluid flow sensor according to clause 1 where the initial estimate is based on a signal external to the sensor.
10. A fluid flow sensor according to clause 1, where if the initial estimate of the flow rate or value corresponding to the flow rate is between the upper and lower thresholds, then the controller uses a weighted average of the signal from the heater and the signals from the temperature sensor to determine the final flow rate, or a value corresponding to the flow rate.
11. A fluid flow sensor according to clause 10, where if the initial estimate of the flow rate or value corresponding to the flow rate is between the upper and lower thresholds, then the portion of heater signal used is greater if the initial estimated value is close to the upper threshold, and the portion of the temperature sensor signals used is greater if the initial estimate is closer to the lower threshold.

Generally, any of the functions described herein can be implemented using software, firmware, hardware (e.g., fixed logic circuitry), or a combination of these implementations.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

Many other effective alternatives will occur to the person skilled in the art. It will be understood that the disclosure is not limited to the described embodiments, but encompasses all the modifications which fall within the spirit and scope of the disclosure.

The invention claimed is:

1. A method for controlling a fluid-flow sensor in the presence of a flowing fluid, the method comprising:
   receiving a signal from a heater of the fluid-flow sensor;
   receiving a signal from a temperature sensor of the fluid-flow sensor;
   determining an initial estimate of a parameter corresponding to a flow rate of the flowing fluid;
   comparing the initial estimate to a threshold parameter; and
   based on the comparison, determining the parameter corresponding to the flow rate of the flowing fluid based on:
   a combination of the signal from the temperature sensor and the signal from the heater of the fluid-flow sensor.

2. A method according to claim 1, further comprising:
   determining the parameter corresponding to the flow rate based on the combination of the signal from the temperature sensor and the signal from the heater of the fluid-flow sensor when the initial estimate is between a first threshold parameter and a second threshold parameter.

3. The method according to claim 1, wherein the combination of the signals from the temperature sensor and the heater of the fluid-flow sensor comprises a weighted average of said signals.

4. The method according to claim 3, wherein the weighted average depends on a difference between the initial estimate and first and second threshold parameters.

5. The method according to claim 1, wherein the signal from the temperature sensor of the fluid-flow sensor comprises signals from two temperature sensors.

6. The method according to claim 1, wherein the signal from the temperature sensor of the fluid-flow sensor comprises a difference in signal from two temperature sensors.

7. A controller for a fluid-flow sensor, the controller being configured, when the fluid-flow sensor is in the presence of a flowing fluid, to:
   receive a signal from a heater of the fluid-flow sensor;
   receive a signal from a temperature sensor of the fluid-flow sensor;
   determine an initial estimate of a parameter corresponding to a flow rate of the flowing fluid;
   compare the initial estimate to a threshold parameter; and
   based on the comparison, determine the parameter corresponding to the flow rate of the flowing fluid based on:
   a combination of the signal from the temperature sensor and the signal from the heater of the fluid-flow sensor.

8. The controller according to claim 7, further configured to:
   determine the parameter corresponding to the flow rate based on the combination of the signal from the temperature sensor and the signal from the heater of the fluid-flow sensor when the initial estimate is between a first threshold parameter and a second threshold parameter.

9. The controller according to claim 7, wherein the combination of the signals from the temperature sensor and the heater of the fluid-flow sensor comprises a weighted average of said signals.

10. The controller according to claim 9, wherein the weighted average depends on a difference between the initial estimate and first and second threshold parameters.

11. A device comprising:
    a fluid-flow sensor; and
    a controller according to claim 7.

12. A controller for controlling a fluid-flow sensor in the presence of a flowing fluid, the fluid-flow sensor comprising a heater and one or more temperature sensors, the controller being configured, in a first mode, to determine a parameter corresponding to a flow rate of the flowing fluid based on signals from the one or more temperature sensors and from the heater; and in a second mode, to determine the parameter based on a signal from the heater only;
    wherein the controller is further configured to:
    determine an initial estimate of the parameter; and
    operate in the first mode when the initial estimate is below a first threshold parameter;
    operate in the second mode when the initial estimate is above a second threshold parameter; and
    operate in a combination of the first and second modes when the initial estimate is between the first and second threshold parameters.

13. The controller according to claim 12, wherein operating in a combination of the first and second modes comprises determining a weighted average of the parameter determined according to the first mode and the parameter determined according to the second mode.

14. The controller according to claim 13, wherein the fluid-flow sensor comprises two temperature sensors, and wherein the controller is configured, in the first mode, to determine the parameter based on signals from the two temperature sensors and from the heater.

* * * * *